US009162495B2

(12) United States Patent
Nihashi et al.

(10) Patent No.: US 9,162,495 B2
(45) Date of Patent: Oct. 20, 2015

(54) PRINTER APPARATUS

(71) Applicant: TOSHIBA TEC KABUSHIKI KAISHA, Shinagawa-ku, Tokyo (JP)

(72) Inventors: Kiyotaka Nihashi, Shizuoka-ken (JP); Tsuyoshi Sanada, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/159,624

(22) Filed: Jan. 21, 2014

(65) Prior Publication Data

US 2015/0202899 A1 Jul. 23, 2015

(51) Int. Cl.

| | |
|---|---|
| ***B41J 2/325*** | (2006.01) |
| ***G01D 15/10*** | (2006.01) |
| ***B41J 11/66*** | (2006.01) |
| ***B41J 11/00*** | (2006.01) |
| *B41J 13/10* | (2006.01) |

(52) U.S. Cl.

CPC .............. *B41J 11/663* (2013.01); *B41J 11/007* (2013.01); *B41J 13/103* (2013.01)

(58) Field of Classification Search

CPC ............ B41J 3/4073; B41J 2/01; B41J 13/12; B41J 11/0085; B41J 11/007; B41J 11/06; B41J 11/0065; B41J 13/103; B41J 2/32; B41J 11/04; B41J 2/325; B41J 11/20; B41J 11/008; G07B 17/00467; G07B 2017/00532

See application file for complete search history.

(56) References Cited

U.S. PATENT DOCUMENTS

2014/0153994 A1* 6/2014 Kubota et al. ................. 400/621

FOREIGN PATENT DOCUMENTS

| | | |
|---|---|---|
| JP | 11-021001 | 1/1999 |
| JP | 2012-180139 | 9/2012 |

* cited by examiner

*Primary Examiner* — Lisa M Solomon

(74) *Attorney, Agent, or Firm* — Amin, Turocy & Watson, LLP

(57) ABSTRACT

A printer apparatus comprises a paper conveyance path configured to pull out wound paper and connect the paper with a paper discharge port, a conveyance unit configured to convey the paper in the paper conveyance path; a printing section configured to print on the paper; a cutter configured to cut the paper on which a given printing operation is carried out by the printing section; a curved paper intrusion section configured to be arranged between the cutter and the paper discharge port to accommodate curved paper the front end of which is not conveyed; and a paper detection section configured to detect the paper intruding into the curved paper intrusion section.

3 Claims, 6 Drawing Sheets

PRINTER APPARATUS

FIELD

Embodiments described herein relate to a printer apparatus which prints on paper and issues the paper.

BACKGROUND

In a printer apparatus used as an apparatus for issuing, for example, a receipt, after given items are printed on long-sized paper pulled from roll-shaped paper, the printed paper is cut into a given length and then discharged.

In paper jam detection, if a printer using cut paper and the like finishes the conveyance of the length of a paper, the receiving signal of a detection sensor is changed. Thus, the detection on paper jam can be carried out by confirming the signal. However, it is difficult to detect the jam of paper wound into a roll shape since the paper is continuous until it is cut. It is known that the detection on the paper jam can be realized by using the paper on the back side of which a black mark for detecting the conveyance of paper is arranged, however, in this detection, it is needed to use dedicated paper and sensors. It is also known that the detection on paper jam can be realized without using the dedicated paper, but by arranging a groove and a sensor on a paper conveyance path, and detecting the paper entering the groove to detect paper jam.

The printed paper is discharged to the outside from a discharge port of the printer apparatus, however, in a case where a shielding member is arranged on the discharge port and the discharging of paper is hindered, the paper flaps in the conveyance path and consequentially creases or rips.

DETAILED DESCRIPTION

A printer apparatus comprises a paper conveyance path configured to pull out wound paper and connect the paper with a paper discharge port; a conveyance unit configured to convey the paper in the paper conveyance path; a printing section configured to print on the paper; a cutter configured to cut the paper on which a given printing operation is carried out by the printing section; a curved paper intrusion section configured to be arranged between the cutter and the paper discharge port to accommodate curved paper the front end of which is not conveyed; and a paper detection section configured to detect the paper intruding into the curved paper intrusion section.

Embodiment 1

The printer apparatus according to the embodiment 1 is described in detail below with reference to accompanying drawings.

Figure 1:
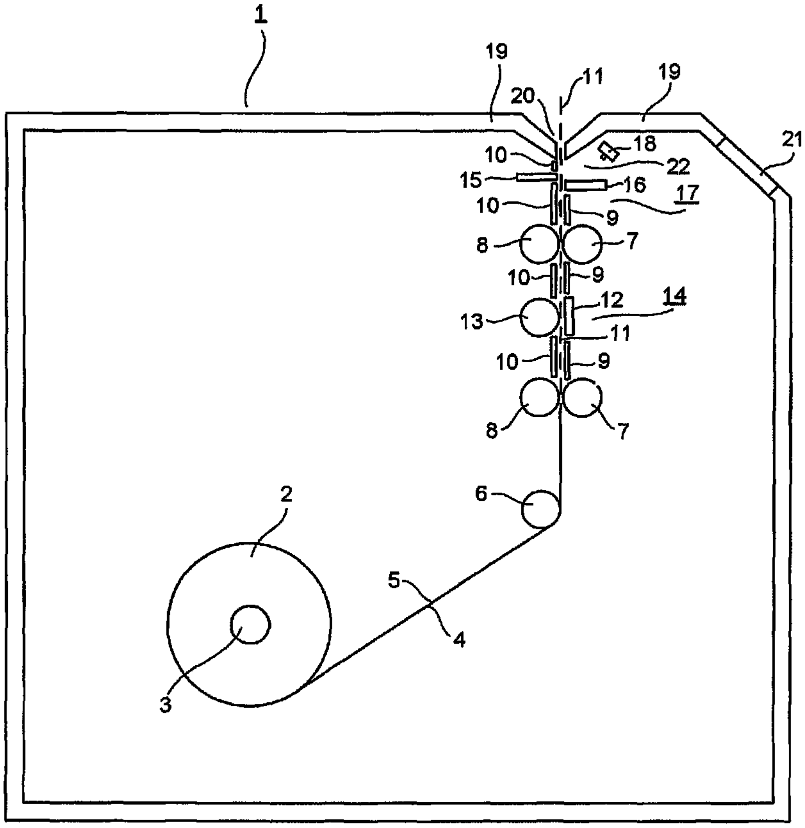
FIG. 1 is a diagram illustrating a main portion constitution of a printer apparatus according to an embodiment 1.

FIG. 1 is a constitution diagram illustrating main portions of a printer apparatus 1 according to the embodiment 1. Further, in the printer, as paper is conveyed from the lower side shown in FIG. 1 to the upper side shown in FIG. 1, the lower side shown in FIG. 1 is referred to as an upstream side and the upper side shown in FIG. 1 is referred to as a downstream side in the following description.

In FIG. 1, the reference sign 2 represents roll-shaped paper wound on a winding shaft 3 which is rotationally supported in the printer apparatus 1.

The paper 2 has a first paper surface 4 and a second paper surface 5 opposite to the first paper surface 4, wherein a thermosensitive layer which generates a color when heated is merely arranged on the first paper surface 4.

An idler roller 6 is rotationally supported at the downstream side of the paper 2 kept in a roll shape.

Further, a conveyance guide A9 and a conveyance guide B10 are arranged to extend from the idler roller 6 of the printer apparatus 1 towards the downstream side of the printer apparatus 1, and the paper 2 is conveyed in the space between the conveyance guide A9 and the conveyance guide B10 which serves as a paper conveyance path 11.

Further, a conveyance roller 7 which can be rotated by a motor (not shown) is arranged at the downstream side of the idler roller 6, a conveyance idler roller 8 is arranged opposite to the conveyance roller 7 across the paper conveyance path 11, and the paper 2 clamped by the conveyance roller 7 and the conveyance idler roller 8 is conveyed to the downstream side through the rotation of the conveyance roller 7 and the conveyance idler roller 8. A plurality of pairs of conveyance rollers 7 and the conveyance idler rollers 8, each pair of which are used in set, are arranged along the paper conveyance path 11.

A thermal print head 12 is arranged at the downstream side of the idler roller 6, and a platen roller 13 which can be rotated by a motor (not shown) is arranged opposite to the thermal print head 12 across the paper conveyance path 11. The thermal print head 12 and the platen roller 13 constitutes a printing section 14 which carries out printing operation on the first paper surface 4 of the paper 2.

A cutter 17 is arranged at the downstream side of the printing section 14. The cutter 17 comprises a movable blade 15 and a fixed blade 16, and cuts a paper by sliding the movable blade 15 towards the fixed blade 16 under the drive of a cutter motor (not shown).

The printer apparatus 1 is provided with a cover 19. An opening section, that is, a paper discharge port 20, from which the paper 2 cut by the cutter 17 is discharged to the outside of the printer apparatus 1 by a discharge roller (not shown), is arranged on the cover 19.

Further, the printer apparatus 1 has a display section 21 for displaying various states, such as an error state, of the printer apparatus 1.

Further, a space section, that is, a curved paper intrusion section 22 and a jam sensor 18, are arranged opposite to the movable blade 15 of the cutter 17 across the paper conveyance path 11.

Figure 2:
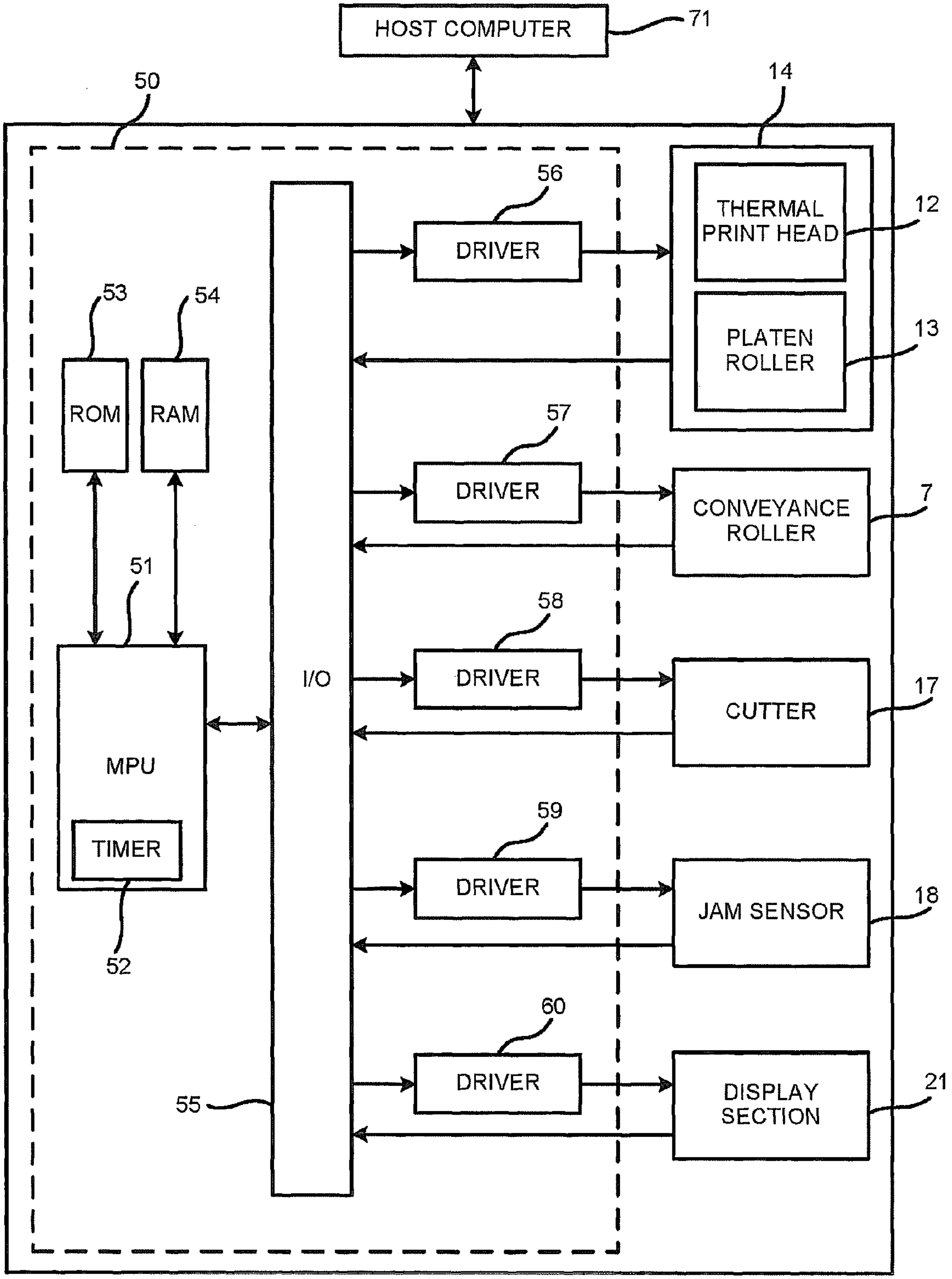
FIG. 2 is a block diagram illustrating a constitution of a control circuit of a printer apparatus according to the embodiment 1.

Next, FIG. 2 is a block diagram illustrating a constitution of a control circuit of the printer apparatus 1 according to the present embodiment. The control section 50 controls the paper conveyance, printing, paper cutting, the detection on paper jam, paper discharging, and the display of the condition of the printer.

The control section 50 is formed by, for example, a microcomputer which associates with a host computer 71 and carries out various controls. A micro processor unit (MPU) 51 of the control section 50 carries out various controls and operations such as a paper conveyance control, a printing control, a paper cutting control, the detection on a paper jam and a paper discharging control.

Further, the MPU 51 comprises a timer 52 serving as a unit for setting and controlling time.

Further, a ROM 53 and a RAM 54 are arranged in the control section 50 as primary storage units for storing the control programs executed by the MPU 51 and the data generated during a control or an operation process.

The ROM 53 is a read-only memory in which control programs and tables are stored, and the RAM 54 is a random access memory for storing the data generated during an operation process.

Further, an input/output unit (I/O) 55 is arranged in the control section 50 to read various input data from the host computer 71 and extract a control output of the control section 50 to the host computer 71. The I/O 55 is connected with the MPU 51, the ROM 53 and the RAM 54 via a bus line.

Further, the I/O 55 is connected with a first, a second, a third, a fourth and a fifth driver 56, 57, 58, 59 and 60 serving as units for extracting a control output.

The first driver 56 supplies a required drive output for the printing section 14. The second driver 57 supplies a required drive output for the conveyance roller 7. The third driver 58 supplies a drive output for the cutter 17. The fourth driver 59 supplies a drive output for the jam sensor 18 which will be described later. The fifth driver 60 supplies a display drive output for the display section 21 to enable the display section 21 to carry out various displays.

When the paper 2 is printed by the printing section 14, the platen roller 13 is rotationally driven by a motor in synchronization with the printing operation based on a control output of a printing instruction unit of the MPU 51. The thermal print heat 12 generates heat and prints on the first paper surface 4 of the paper 2 based on the printing data from the host computer 71.

The MPU 51 of the control section 50 rotates the conveyance roller 7 and stops the rotation of the conveyance roller 7 with the driver 57.

The MPU 51 of the control section 50 drives, with the driver 58, the cutter 17 to cut the paper 2.

The MPU 51 of the control section 50 drives, with the driver 59, the jam sensor 18, and receives a detection signal.

The MPU 51 of the control section 50 displays various information and errors of the printer apparatus 1 on the display section 21 under the drive of the driver 60.

Figure 3:
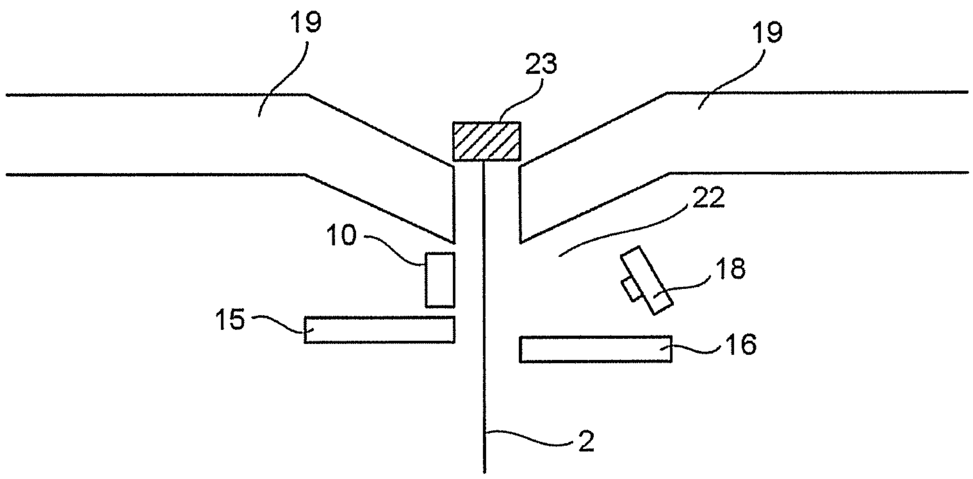
FIG. 3 is a diagram illustrating a main portion constitution of a printer apparatus according to the embodiment 1 when a front end of paper is stopped.
Figure 4:
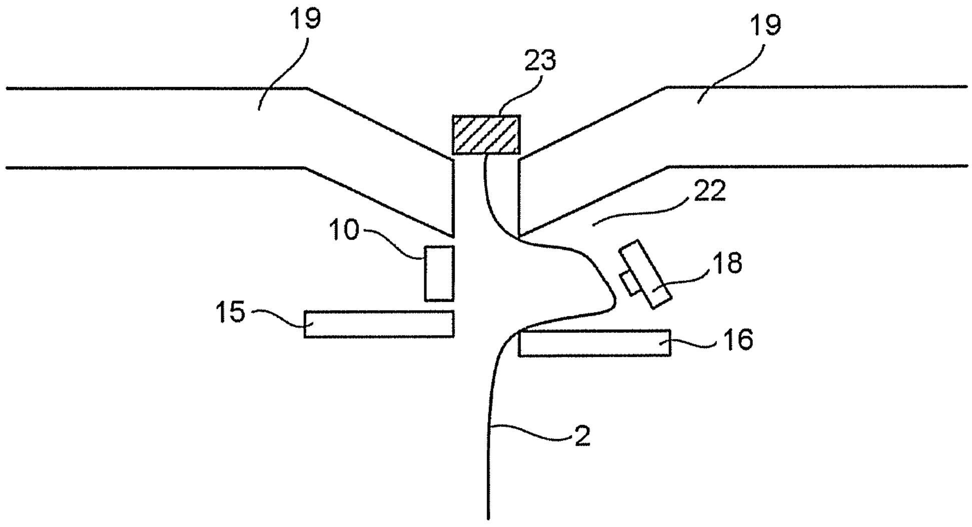
FIG. 4 is a main portion constitution diagram of a printer apparatus according to the embodiment 1 illustrating the shape of paper after the front end of the paper is stopped.

Next, the operations of the printer apparatus 1 are described with reference to FIG. 3-FIG. 4. The control section 50 conveys paper and carries out a printing job according to a program stored in the ROM 53.

The operator first loads the roll-shaped paper 2 wound on the winding shaft 3 into the printer apparatus 1. Next, the operator pulls out the paper 2 and places the front end of the paper 2 between the conveyance roller 7 and the conveyance idler roller 8 located at the most upstream side in the plurality of conveyance rollers 7 and the conveyance idler rollers 8 via the idler roller 6.

In this state, if the printing data is received from the host computer 71, the control section 50 drives the printing section 14 to carry out a given printing operation on the first paper surface 4 while rotating the conveyance roller 7. Then, the paper 2 cut into a given length by the cutter 17 is discharged to the outside of the printer apparatus 1 from the paper discharge port 20. Further, in a case where the content to be printed is long, the front end of the paper 2 is discharged from the paper discharge port 20 to the outside of the printer apparatus 1 before the paper is cut by the cutter 17.

The paper discharge port 20 of the printer apparatus 1, when in a normal state, is opened so as not to hinder the discharging of the paper 2. However, when the paper discharge port 20 is arranged on the upper portion of the printer apparatus 1, as shown in FIG. 1, sometimes the paper discharge port 20 may be blocked by a shielding member 23 arranged at the position of the paper discharge port 20 or a hand. Further, when the paper discharge port 20 is arranged at the lateral side of the printer apparatus 1, the paper discharge port 20 may also be blocked by a hand. The state is shown in FIG. 3. In this case, although the front end of the paper 2 is stopped at the paper discharge port 20, the conveyance of the paper 2 in the paper conveyance path 11 is continued as the conveyance roller 7 is rotated continuously. If conveyed continuously, the paper 2 starts to crumple and consequentially creases, deforms and rips. However, in the embodiment 1, as shown in FIG. 4, a curved paper intrusion section 22 is arranged nearby the paper discharge port 20 and a jam sensor 18 is arranged in the curved paper intrusion section 22. Further, the curved paper intrusion section 22 refers to a space where the cured paper 2 intrudes when the conveyance of the front end of the paper 2 being conveyed is stopped by the shielding member 23.

In the embodiment 1, as the paper discharge port 20 is blocked by the shielding member 23 and the front end of the paper 2 is stopped at the paper discharge port 20, the paper 2, even if continuously conveyed by the conveyance roller 7, starts to crumple in the conveyance path and intrudes into the curved paper intrusion section 22 before getting creased, deformed and ripped.

A reflection type sensor, that is, the jam sensor 18, is arranged in the curved paper intrusion section 22. If the paper 2 intrudes into the curved paper intrusion section 22 and reaches the detection range of the jam sensor 18, the jam sensor 18 detects the occurrence of a jam, and the control section 50 receives the detection result and displays the occurrence of the paper jam on the display section 21 while stopping the printer apparatus 1.

In this way, even if the paper discharge port 20 is blocked by the shielding member 23, the intrusion of the paper 2 into the curved paper intrusion section 22 arranged nearby the paper discharge port 20 is detected by the jam sensor 18. Consequentially, the paper jam can be detected before the paper 2 starts to crumple in the conveyance path, and then creases, deforms and rips. Further, the creases or deformation mentioned here refer to creases or deformation disenabling the use of the paper 2 which is being printed as output paper after paper jam is eliminated.

Further, a paper jam is detected by detecting whether or not there is paper 2 intruding into the curved paper intrusion section 22. Thus, no special expensive paper arranged with a black mark is needed to detect a paper jam.

Embodiment 2

In the embodiment 2, a jam occurrence time measurement section (not shown) is also arranged on the basis of the embodiment 1 to continue a printing operation if a jam detection signal is interrupted within a predetermined time.

If the jam sensor 18 detects the intrusion of the paper 2 into the curved paper intrusion section 22, the printer apparatus 1 recognizes a paper jam and then stops the printing on the paper 2, the conveyance of the paper 2 and the cutting of the paper 2. It is preferred to stop the printer apparatus 1 if it is needed to open the cover (not shown) of the printer apparatus 1 to remove jammed paper 2.

However, after the shielding member 23 is removed, the waist or the front end of the paper 2 is sometimes pulled out by the operator with a hand to take out the paper 2 from the curved paper intrusion section 22. If the intrusion time of the paper 2 in the curved paper intrusion section 22 is short, it is preferred that the printer apparatus 1 is enabled to operate again after the paper jam is eliminated so as to shorten the non-operating time of the printer apparatus 1. Thus, a jam occurrence time measurement section is additionally arranged in the control section 50 according to the embodiment 2.

Figure 5:
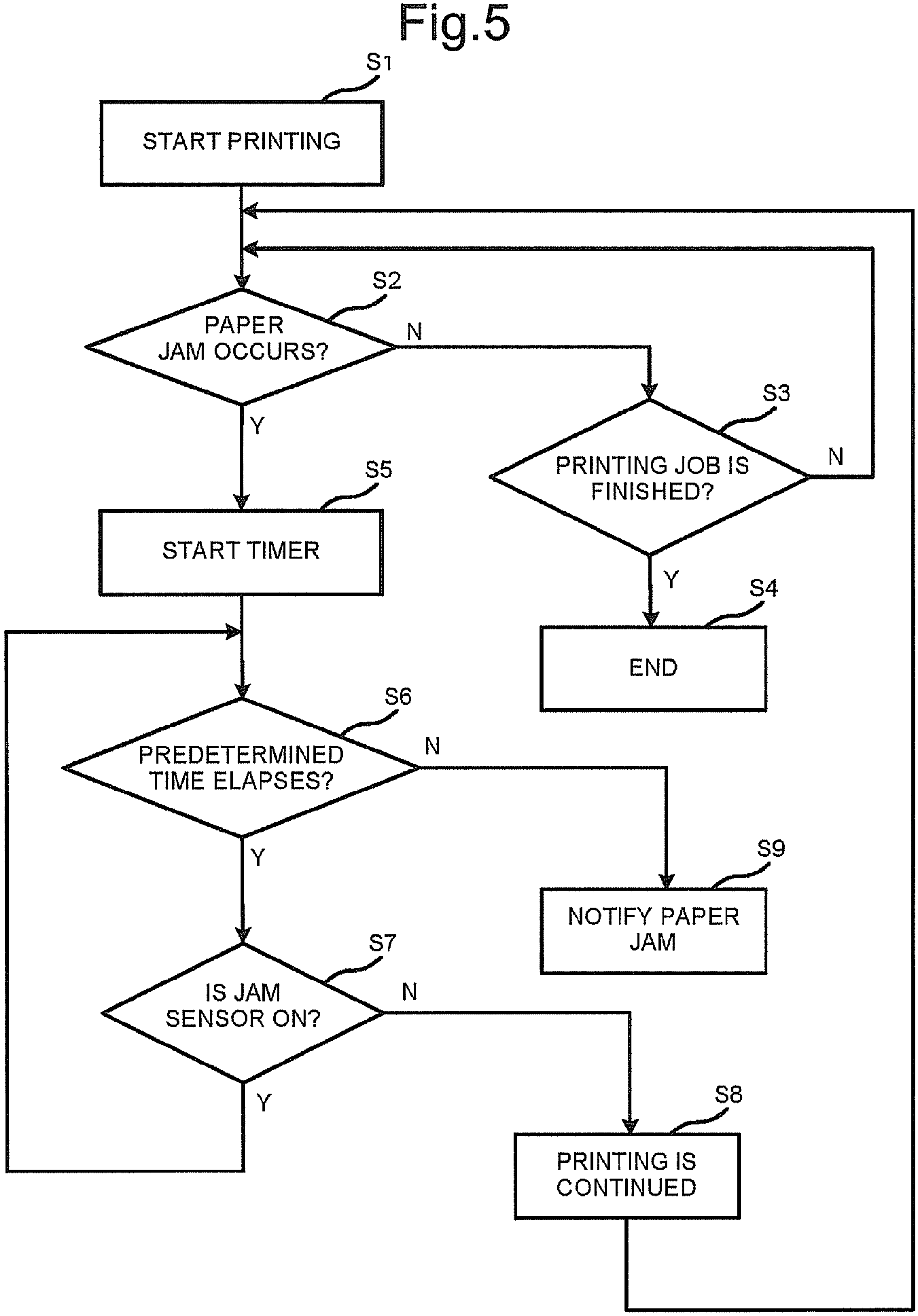
FIG. 5 is a flowchart illustrating the recovery of a printer apparatus according to an embodiment 2 from a paper jam state.

The paper jam detection carried out in the embodiment 2 is described below with reference to FIG. 5.

The printer apparatus 1 starts a printing job after receiving printing data from the host computer 71 (ACT S1). During the printing process, whether or not a paper jam occurs is detected periodically, that is, whether or not there is paper 2 intruding into the curved paper intrusion section 22 is checked by the jam sensor 18 (ACT S2). Herein, the printer apparatus 1 carries out a printing operation if there is no paper jam (NO in ACT S2), sequentially confirms whether or not all the printing data received is printed (ACT S3), and continues to print while confirming the occurrence of the paper jam if there is residual printing data (NO in ACT S3), or ends the printing operation (ACT S4) if there is no residual printing data (YES in ACT S3).

If a paper jam is detected during the printing process (YES in ACT S2), the control section 50 operates the jam occurrence time measurement section arranged in the ROM 53, and starts the timer 52 (ACT S5) and periodically confirms whether or not a predetermined time elapses since the timer is started (ACT S6). Further, the predetermined time refers to a time which is optionally set during the setting of the printer apparatus 1, and refers to a set time within which the paper jam can be determined to be not serious because if the paper 2 comes out to the outside from the curved paper intrusion section 22 within the set time, no fault will be caused even if the printing of the printer apparatus 1 is continued.

It is periodically confirmed whether or not the predetermined time elapses since the timer is started (ACT S6), if the predetermined time does no elapse (NO in ACT S6), it is confirmed whether or not the jam sensor 18 is 'ON', that is, whether or not the paper 2 is still left in the curved paper intrusion section 22 (ACT S7).

If the jam sensor 18 is 'ON', that is, if the paper 2 is still left in the curved paper intrusion section 22 (YES in ACT S7), whether or not the predetermined time elapses is confirmed again (ACT S6).

If it is determined that the jam sensor 18 is not 'ON', that is, the paper 2 comes out to the outside from the curved paper intrusion section 22 before the predetermined time elapses (NO in ACT S7), it is determined that the paper jam is eliminated, and then the printing is continued (ACT S8). When the printing is continued, like in the normal printing process, the processing in ACT S2 is carried out again to periodically check whether or not a paper jam occurs, that is, to check whether or not there is paper 2 intruding into the curved paper intrusion section 22 with the jam sensor 18.

It is periodically confirmed whether or not the predetermined time elapses since the timer is started (ACT S6), if the predetermined time elapses (YES in ACT S6), the paper jam is not eliminated, and then a paper jam is notified and the printer apparatus 1 is stopped (ACT S9).

As stated above, a jam occurrence time measurement section is arranged in the embodiment 2, and a printing operation is continued if a jam detection signal is interrupted within a predetermined time, which can shorten the non-operating time of the printer apparatus 1.

Embodiment 3

In the embodiment 3, a curved paper intrusion section 22 is arranged matching with the curl direction of the paper 2.

The paper 2 is wound on the winding shaft 3 for storage and use. Thus, the paper 2 is likely to curl. By arranging the curved paper intrusion section 22 matching with the curl direction of the paper 2, the paper 2 enters the curved paper intrusion section 22 easily after the paper discharge port 20 is blocked.

Figure 6A:
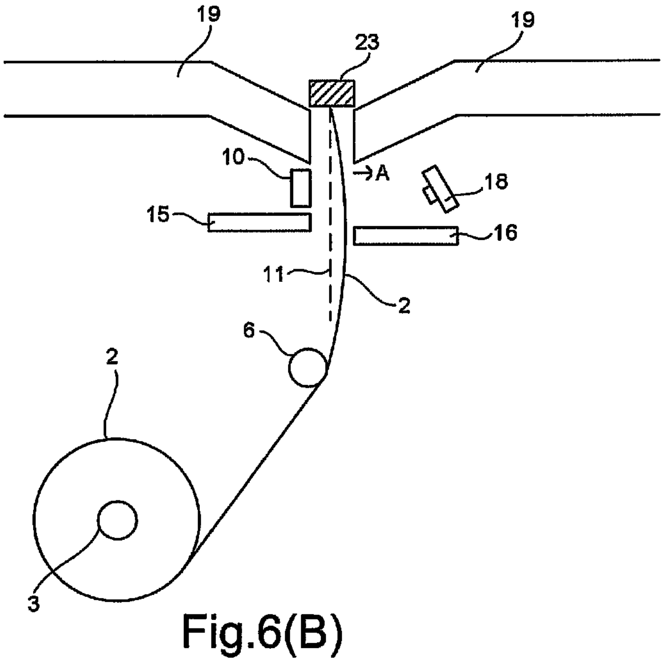
FIG. 6(A) is a main portion constitution diagram illustrating the position relation between the winding curl of a paper and a curved paper intrusion section according to an embodiment 3 (the peak of the winding curl of the paper is at the right side)
Figure 6B:
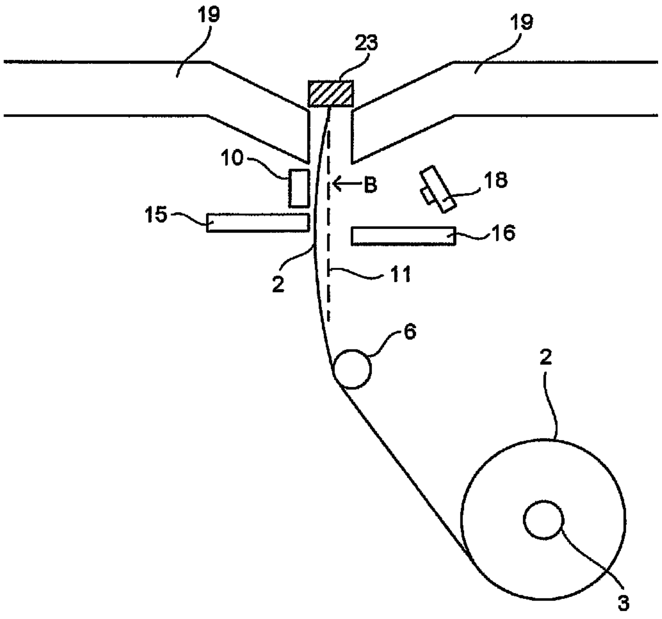
FIG. 6(B) is a main portion constitution diagram illustrating the position relation between the winding curl of a paper and a curved paper intrusion section according to an embodiment 3 (the peak of the winding curl of the paper is at the left side)

FIG. 6 illustrates the position relation between the winding curl of the paper 2 and the curved paper intrusion section 22. Further, for the sake of convenience of understanding, the printing section 14, the conveyance roller 7 and the conveyance idler roller 8 are not described herein.

In FIG. 6 (*a*) and FIG. 6 (*b*), the curved paper intrusion section 22 is arranged on the right side relative to the paper conveyance path 11, the peak of the winding curl of the paper shown in FIG. 6 (*a*) is at the right side of FIG. 6 (*a*), the peak of the winding curl of the paper shown in FIG. 6 (*b*) is at the left side of FIG. 6 (*b*). In FIG. 6 (*a*) and FIG. 6 (*b*), in a case where the paper discharge port 20 is blocked by the shielding member 23, although the front end of the paper 2 is stopped at the paper discharge port 20, the conveyance of the paper 2 is continued in the paper conveyance path 11 because of the continuous rotation of the conveyance roller 7. In this case, the paper 2 moves in a direction A shown in FIG. 6(*a*) when the peak of the winding curl of the paper is at the right side, as shown in FIG. 6 (*a*). At this time, since the curved paper intrusion section 22 is arranged in the movement direction of paper 2, the paper 2 can move into and move out from the curved paper intrusion section 22 easily.

However, the paper 2 moves in a direction B shown in FIG. 6(*b*) when the peak of the winding curl of the paper is at the left side shown in FIG. 6 (*b*). In this case, since no curved paper intrusion section 22 is arranged in the movement direction of the paper 2, the paper 2 can hardly, or even cannot, enter the curved paper intrusion section 22, and consequentially, the paper 2 crumples and further creases, deforms and rips. That is, the paper 2 shown in FIG. 6 (*a*) can enter the curved paper intrusion section 22 more easily than that shown in FIG. 6 (*b*). Thus, if the curved paper intrusion section 22 is arranged matching with the curl direction of the paper 2, a paper jam can be detected before the occurrence of creases, deformation and rip in the following paper 2 even if the paper discharge port 20 is blocked by the shielding member 23.

Embodiment 4

Figure 7:
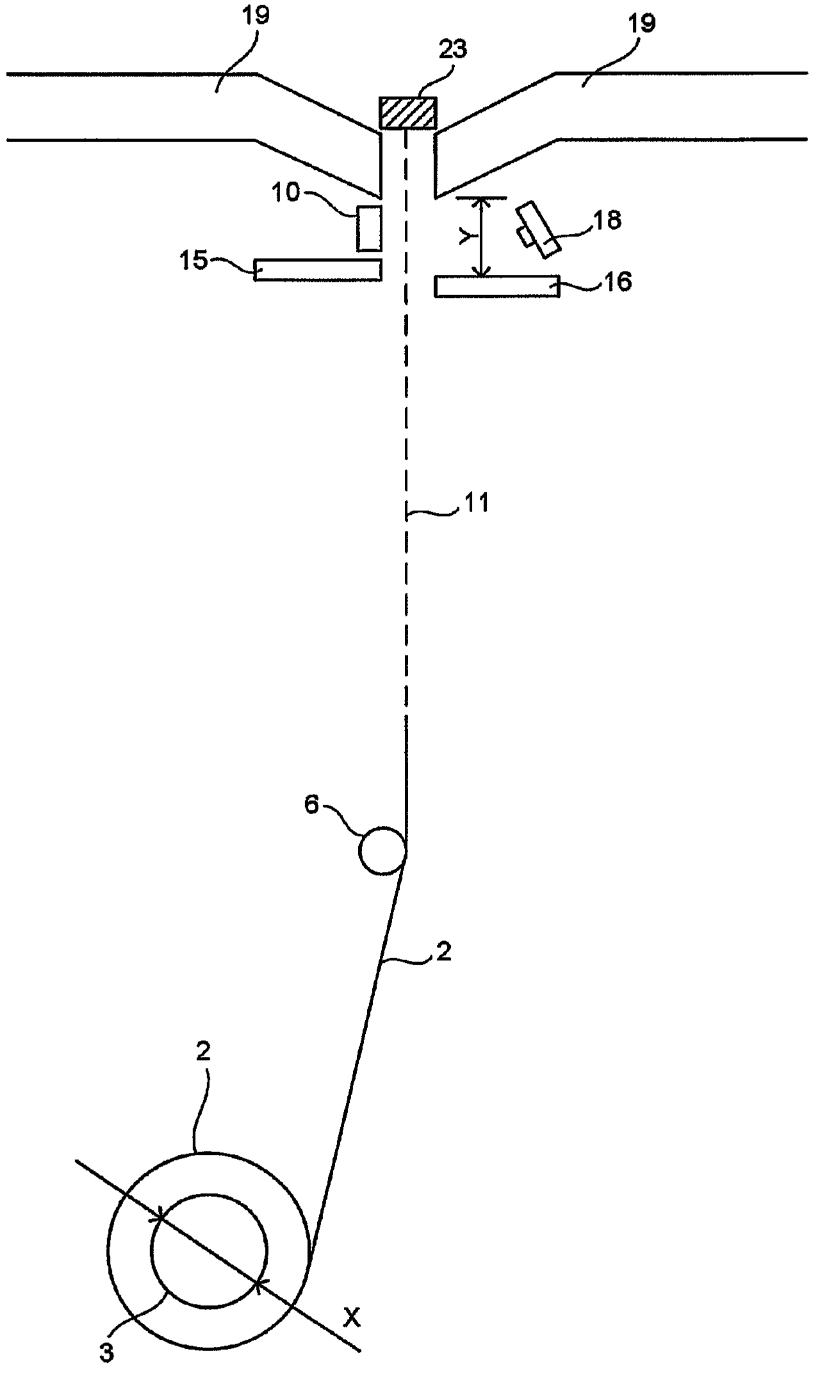
FIG. 7 is a main portion constitution diagram illustrating the relation between the diameter of a paper winding shaft and an opening section of a curved paper intrusion section according to an embodiment 4.

An embodiment 4 is illustrated in FIG. 7. In the embodiment 4, the opening section of the curved paper intrusion section 22 is smaller than the diameter of the winding shaft 3 on which the paper 2 is wound.

When the paper discharge port 20 is blocked by the shielding member 23, a paper jam is detected by detecting the intrusion of the paper 2 into the curved paper intrusion section 22. The paper 2 intrudes into the curved paper intrusion section 22 easily when the paper discharge port 20 is blocked, and it is needed to prevent the paper 2 from intruding into the curved paper intrusion section 22 when the paper discharge port 20 is not blocked.

The diameter of the paper 2 increases gradually with the winding of the paper 2 on the winding shaft 3, and the winding curl of the paper 2 is weakened with the increase in the diameter. That is, when the winding of the paper 2 on the winding shaft 3 is just started, the paper 2 has the greatest winding curl which is substantially equal to the winding shaft 3

When the diameter of the winding shaft 3 is set to be x, the opening section of the curved paper intrusion section 22, that is, y, meets the condition of x>y. In this way, the paper 2 is prevented from intruding into the curved paper intrusion section 22 when the paper discharge port 20 is not blocked.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer apparatus, comprising:

a paper conveyance path configured to pull out wound paper and connect the paper with a paper discharge port;

a conveyance unit configured to convey the paper in the paper conveyance path;

a printing section configured to print on the paper;

a cutter configured to cut the paper on which a given printing operation is carried out by the printing section;

a curved paper intrusion section configured to be arranged between the cutter and the paper discharge port to accommodate curved paper the front end of which is not conveyed; and a paper detection section configured to detect the paper intruding into the curved paper intrusion section, wherein the curved paper intrusion section is arranged at a side of a peak of a winding curl of the paper relative to the paper conveyance path.

2. The printer apparatus according to claim 1, wherein the paper detection section is further provide with a timer for measuring the staying time of the paper in the curved paper intrusion section.

3. The printer apparatus according to claim 1, wherein the paper is paper wound on a winding shaft, the diameter of which is greater than an opening section of the curved paper intrusion section.

* * * * *